June 17, 1924.  1,497,990

J. H. SCHELL

MACHINE FOR CUTTING CAKE, SOAP, AND OTHER ADHESIVE SUBSTANCES

Filed Dec. 10, 1923  2 Sheets-Sheet 1

Inventor
J. H. Schell
By Marks & Clerk
Attys

June 17, 1924.  1,497,990
J. H. SCHELL
MACHINE FOR CUTTING CAKE, SOAP, AND OTHER ADHESIVE SUBSTANCES
Filed Dec. 10, 1923    2 Sheets-Sheet 2

Inventor
J. H. Schell
By Marks & Clerk
Attys.

Patented June 17, 1924.

1,497,990

UNITED STATES PATENT OFFICE.

JOHAN HENDRIK SCHELL, OF ROTTERDAM, NETHERLANDS.

MACHINE FOR CUTTING CAKE, SOAP, AND OTHER ADHESIVE SUBSTANCES.

Application filed December 10, 1923. Serial No. 679,758.

*To all whom it may concern:*

Be it known that I, JOHAN HENDRIK SCHELL, a subject of the Queen of the Netherlands, residing at Rotterdam, Province of South Holland, Kingdom of the Netherlands, have invented certain new and useful Improvements in or Relating to Machines for Cutting Cake, Soap, and Other Adhesive Substances, of which the following is a specification.

The invention relates to improvements in machines for cutting slices of cake, soap and other adhesive substances and more particularly in machines of this type designed for large output.

It is known in the art to cut cake plates coming from an oven first into strips the width of which is equal to the length of a cake. It is also known to cut those strips so as to form cakes by means of a machine comprising a single circular knife against which the strips are pressed or pushed. Cutting machines are also known which have a plurality of knives mounted on a bridge which can be moved up and down. Such machines, however, are not adapted for cutting cake and other adhesive substances as by the adhesion of the material on the knives a good cut cannot be obtained.

According to the invention the cutting members, of a machine are actuated in such a manner that they perform not only a compound movement, to and fro and up and down, but also at the same time a swinging movement within their own plane, the feed or forward movement of a strip of material taking place in such a manner that the movement occurs during the backwards movement of the cutting members and with the same speed as said members while during the cutting movement of the cutting members the strip does not move. Preferably between the cutting members are arranged gripping members which, during the cutting movement of the cutting members, resiliently press upon the strip of material.

The feed movement of the strip of material according to the invention is effected by means of a feed device comprising a ratchet mechanism, but it has been found that the feed device is not necessary when the adhesiveness of the material to be cut is such that the knives by their rearward movement themselves take the strip along with them.

The invention will now be described with reference to the annexed drawings showing a machine for cutting cakes constructed according to the invention.

Figure 1:
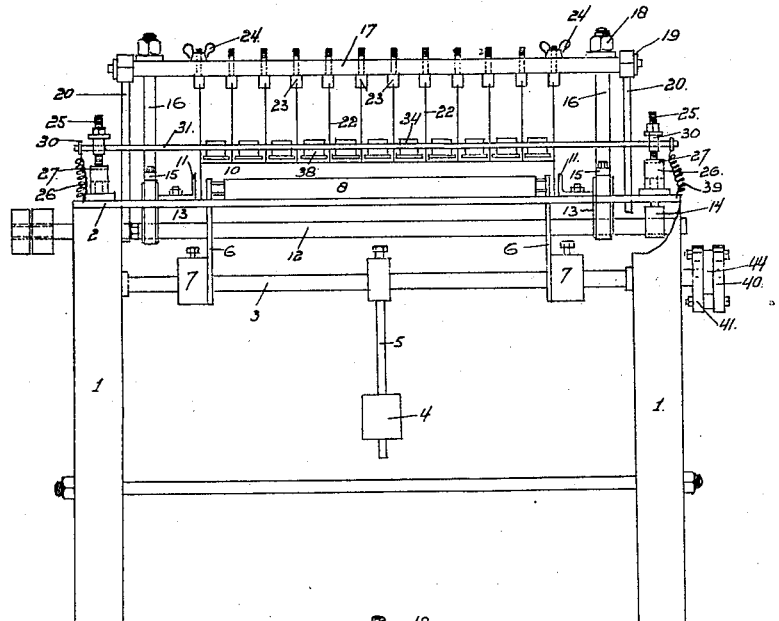
Fig. 1 is a front elevation of the machine partly broken away.

The improved apparatus is mounted upon a bed plate 2 supported on a frame 1, the plate being provided as usual with slots through which the knives pass when moving downwards. In bearings in the side pieces of the frame a shaft 3 is journaled carrying an arm 5 upon which a weight 4 is clamped. To the shaft are also fixed two bars 6 by means of set screws provided in bosses 7, the bars being provided with slots in which is loosely journalled a wooden roller 8. By means of short arms 9 a feed plate 10 is pivotally connected to the ends of the roller, the plate being arranged to bear against and move the strip of cake to be cut. At the sides the strip of cake is guided between two angle pieces 11 which are adjustable with regard to the breadth of the strip. On the main shaft 12 of the machine there are as shown on the left hand side in Fig. 1, fast and loose pulleys in the case where the machine is to be actuated by a belt. On the shaft 12 are also eccentrics 13 and cams 14 (in Fig. 1) the cam 14 at the right hand side of the figure being visible as at that side a part of the frame 1 is broken away.

Figure 2:
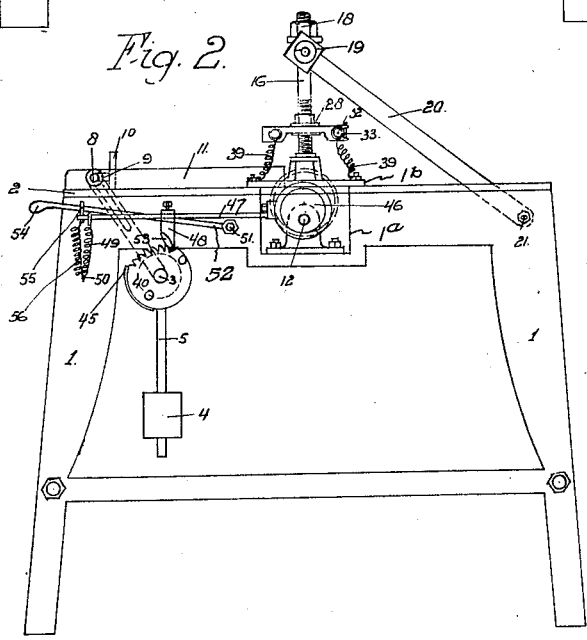
Fig. 2 is a side elevation looked at from the right hand side of Fig. 1.
Figure 3:
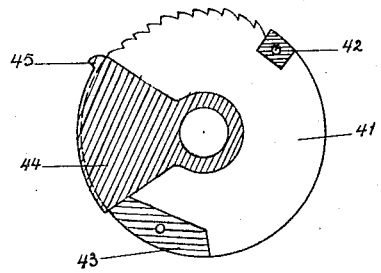
Fig. 3 is a section, and Fig. 4 an elevation of the feed device comprising a double ratchet appliance referred to below.
Figure 4:
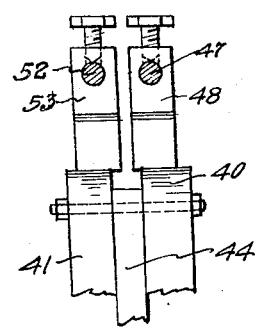
Figure 5:
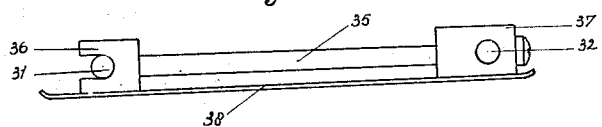
Figs. 5 and 6 are side and plan views of the members which press the strip during the cutting operation.
Figure 6:
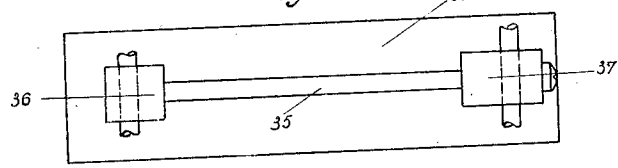

Rods 16 are connected with the outer rings or bands of the eccentrics 13 as indicated at 15 and the upper ends of the rods are threaded and secured by nuts 18 to a cross head 17 which is rectangular in cross section and which with the rods 16 forms a movable frame. The threaded upper end of each of the rods 16 extends through a longitudinal slot in the rod 17. Each end of the square rod 17 is connected to one end of a rod 20 the other end of which at 21 is connected to the frame 1, preferably to a shaft running parallel to the main shaft 12. Between the rods 16 knives 22 are arranged at an equal distance apart, the distance corresponding to the width of the cakes. The knives are fixed in holders 23 the upper ends of which are threaded and pass through a longitudinal slot in the rod 17 and are fixed in the rod 17 by means of winged nuts 24 (two of said nuts being shown in Fig. 1). The knives can therefore be displaced within the slot and spaced apart so as to correspond to the width of the cakes to be cut. The knives are mounted in such a manner that their cutting edges are directed towards the feed device. On the cams 14 run two small rollers rotatably mounted at the lower end of two bolts 25 which with their piston shaped parts 26 are guided in cylindrical guides 27. To each of the bolts 25 a bridge piece 30 is fixed by means of tightening nuts 28, 29, the bridge piece carrying two parallel rods 31, 32. As is shown in Fig. 2, the rod 31 extends through a hole in the bridge piece 30 while the rod 32 is fixed by means of a key 33 in a recess at the outer end of the bridge piece. To both ends of said rods 31, 32 springs 39 are attached which press the whole mechanism with its rollers upon the cams 14. Between the knives 22 and the rods 31, 32, gripping devices designated at 34 (Fig. 1) are arranged. These devices as appears from Figs. 5 and 6, consist of a rod 35 with heads 36, 37. The devices carry at their under sides slide like plates 38, the width of which is about equal to the distance between the knives. As appears from Fig. 5 the heads 36 of the gripping devices are slipped over the rod 31, while the rod 32 extends through a hole in the head 37 in which the rod is fixed by a screw. By removing the keys 33 the rod 32 with the whole set of gripping devices 34 may be removed. The shaft 12 with the members carried thereby can also be easily removed as the bearings for the shaft are mounted in recesses 1ª in the side members of the frame. The rods 31 and 32 with the gripping devices arranged therebetween and the bridge pieces 30 may in an alternative arrangement be replaced by a single plate which at its outer ends is attached on the screw bolts 25 and which has the same number of slots as the plate 2 for permitting movement of the knives 22. The middle portion of the plate 2 is removable while the recesses 1ª in the side parts of the frame are each bridged by a piece 1ᵇ which is attached by means of nuts and whereon the cylinder 27 is fixed. This construction therefore is such that the machine can be cleaned easily.

At one end of the shaft 3 is arranged the actuating device for the feed plate 10 consisting of two discs 40 and 41 which are fixed to the shaft 3 and provided on part of their circumference with ratchet teeth and which are kept at a short distance one from the other by means of distance pieces 42, 43 fixed by bolts. On the spindle 3 between the discs a sector 44 is loosely arranged whose circumference projects somewhat beyond the ratchet teeth, the sector being provided with a tooth 45. The main shaft 12 at the right hand outer side of the machine carries an adjustable eccentric 46 shown in Figure 2 the strap of which is connected to a rod 47 carrying a pawl 48 co-acting with the teeth of the disc 40. The outer end of the rod 47 is connected to a spring 49 attached at 50 to the frame 1. Between this rod and the side member of the frame 1 there is pivotally mounted at 51 a second rod 52 which carries next to the pawl 48 a pawl 53 coacting with the teeth of the disc 41. The pawls 48 and 53 are so broad that they partly project at the inner side over the discs. The rod 52 ends in a handle 54 and is on this side provided with a clasp 55, which also is connected by means of a spring 56 to the frame 1 at the point 50 and which grips below the lever 47.

The machine works as follows:

When the main shaft 12 is rotated, the frame consisting of the parts 16 and 17 is by the intermediary of the eccentrics 13 and the rods 20 moved in such a manner that the knives perform a compound movement up and down and to and fro and at the same time a swinging movement. At the same time the eccentric 46 actuates by means of the pawl 48 the disc 40 so that the arm 5 with the weight 4 is moved upwards in steps and is prevented from falling backwards during the sliding of the pawl 48 over the teeth of the disc 40 by the pawl 53 coacting with the teeth of the second disc 41 and prevents the double disc appliance from rotating backwards. The shaft 3 is in this way rotated in steps while the bars 6 follow this movement and the roller 8 with the plate 10 moves forwards over the plate 2. When now the plate 10 has reached the limit of its movement, the pawl 48 engages and rides over and behind the tooth 45 of the sector 44, which latter is moved along with the discs 40 and 41. The pawl 53 also moves behind the tooth 45 and both pawls will be free from the teeth of the discs 40 and 41. As a result these discs return to their original position by the action of the weight 4. By lifting the rod 52 by means of the handle 54 the member 55 will lift the rod 47 so that both pawls will disengage the discs and the latter being released can fall back into the original position in which position the pawls again engage with the teeth of the discs and the feed device again starts working. During each feed movement the eccentrics 13 have moved the frame 16—17 in such a manner that the knives not only perform an upward movement but also a rearward movement with a speed which is equal to the feed movement of the strip of cake. The position of both the eccentrics 13 with regard to the position of the eccentric 46 is such that the strip of cake or other substance is cut when the cake is stationary. During the cutting period the cam discs 14 are in such a position that the rods 31, 32 with the intermediate gripping members 34 are held in the lowest position by the springs 39 in which they press upon and hold the strip. Both the outer knives cut a thin strip from the sides of the cake strips.

What I claim is:

1. In a cutting machine, a plurality of cutting members, a movable frame supporting said cutting members, a drive shaft, a frame structure supporting said drive shaft, means connecting the first mentioned frame with said frame structure, means for transmitting movement from the shaft to the first mentioned frame whereby the latter is caused to have a combined movement up and down and to and fro, means for feeding material in the direction of the cutting members, said feeding means being arranged to feed the material during the rearward inoperative movement of the cutting members and to move said material at the same speed as the movement of said cutting members, and means for retaining the material in position during the cutting movement of the cutting members.

2. A machine as claimed in claim 1 characterized by the provision of a plurality of gripping members arranged between the cutting members, and means to actuate the gripping members whereby to cause the latter to grip the material during the cutting movement of the cutting members.

3. A machine as claimed in claim 1 characterized in that the means for effecting movement of the cutter member carrying frame is constituted by eccentrics mounted on said shaft, and the provision of links pivotally connecting said frame with the frame structure.

4. A machine as claimed in claim 1 characterized in that the feeding means for the material includes companion ratchet wheels, a shaft carrying said ratchet wheels, a sector-shaped member provided with a single tooth arranged between the ratchet wheels and movable relatively thereto, means for limiting the movement of the sector-shaped member with relation to the companion ratchet wheels, a pawl coacting with the teeth of one of the ratchet wheels and actuated by the first mentioned shaft whereby to rotate the second mentioned shaft step by step, a second pawl coacting with the other ratchet wheel and arranged to lock the companion ratchet wheels against backward rotation, said sector-shaped member being arranged to engage and lift both pawls out of engagement with their respective ratchet wheels when the second mentioned shaft has turned through a predetermined angle, and means for disengaging both of said pawls of the sector-shaped member whereby to permit the latter together with the companion ratchet wheels to return to initial position subsequent to a feeding operation of the feeding means.

In testimony whereof I affix my signature.

JOHAN HENDRIK SCHELL.